United States Patent [19]

Martin

[11] Patent Number: 4,523,904
[45] Date of Patent: Jun. 18, 1985

[54] BLOW MOLDING APPARATUS
[75] Inventor: Merritt W. Martin, Saline, Mich.
[73] Assignee: Owens-Illinois, Inc., Toledo, Ohio
[21] Appl. No.: 594,075
[22] Filed: Mar. 28, 1984
[51] Int. Cl.³ .......................... B29C 1/16; B29C 17/07
[52] U.S. Cl. ..................................... 425/539; 425/540
[58] Field of Search ................................ 425/539, 540
[56] References Cited
U.S. PATENT DOCUMENTS

| 2,750,625 | 6/1956 | Colombo | 425/536 |
| 2,784,452 | 3/1957 | Ruekberg et al. | 425/536 |
| 3,804,573 | 4/1974 | Del Piero | 425/387 B |

FOREIGN PATENT DOCUMENTS

WO81/01679  6/1981  PCT Int'l Appl. ................ 425/439

Primary Examiner—Thomas P. Pavelko
Attorney, Agent, or Firm—Thomas L. Farquer; Steve M. McLary

[57] ABSTRACT

In a blow molding apparatus where a plurality of sets of molds are mounted on a wheel rotatable about an axis and the molds are moved toward and away from one another to enclose a parison and the parison is blown to the confines of the cavity between the mold sections as the wheel rotates by the application of air, an apparatus for controlling the application of the air comprising a valve assembly associated with each set of molds on the wheel and comprising a valve which is opened and closed to control the flow of air to the mold. The valve assembly includes a rotatable cam for moving the valve to open and closed positions, a starwheel associated with the cam, and a first actuator mounted at a first position along the path of the wheel for engagement with the starwheel to rotate the cam and open the valve and a second actuator mounted at a second position along the path of the wheel for engagement with the starwheel to rotate the cam and close the valve.

13 Claims, 8 Drawing Figures

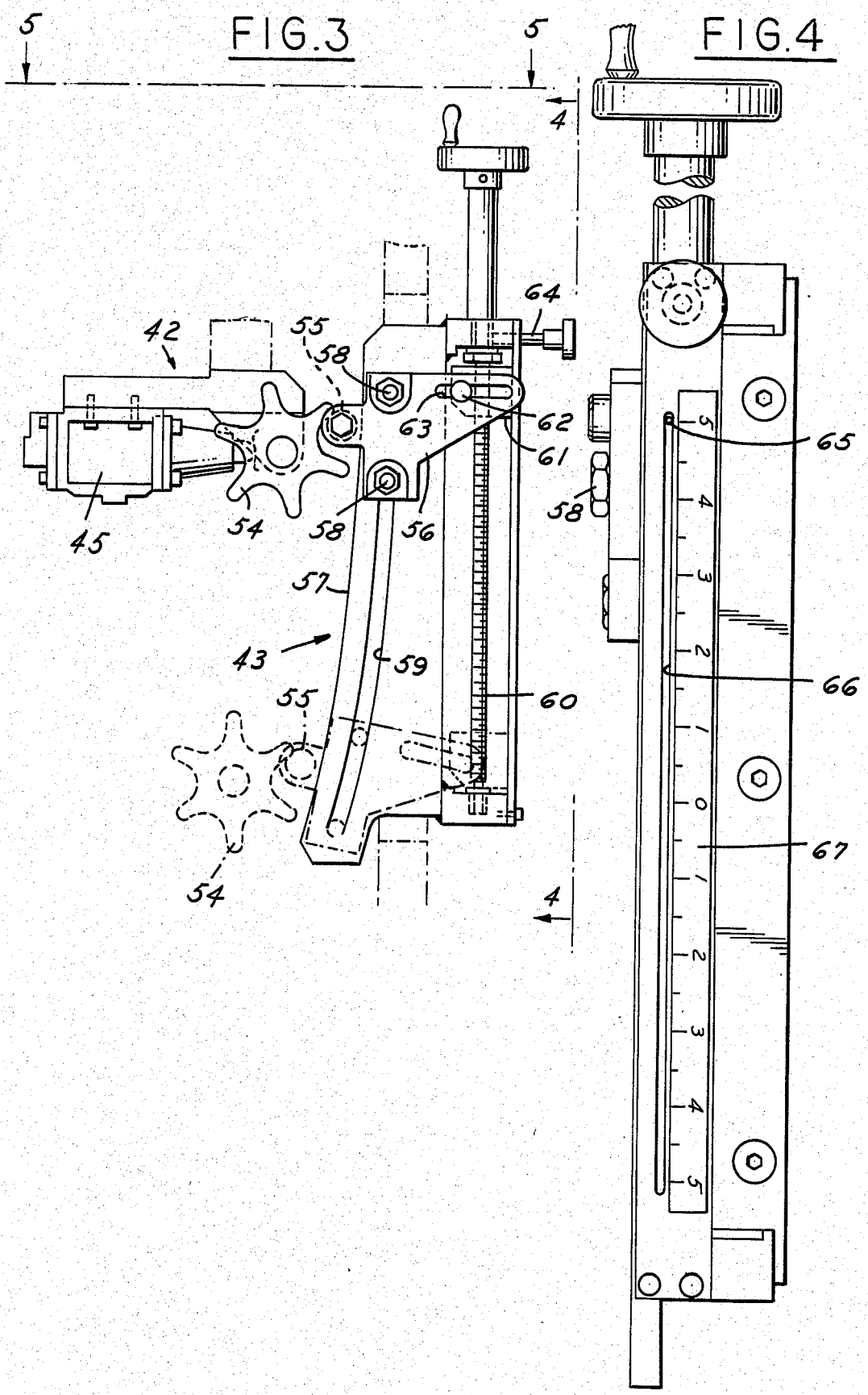

BLOW MOLDING APPARATUS

This invention relates to blow molding apparatus and particularly to blow molding machines of the wheel type.

BACKGROUND AND SUMMARY OF THE INVENTION

In blow molding machines of the wheel type, a wheel supports a plurality of circumferentially spaced sets of molds and is generally rotated about a horizontal axis. Plastic tubing is continuously extruded downwardly between the open mold sections and then the molds are closed as they move about an annular path and the portion of the tubing within the molds is blown within the confines of the mold to provide a hollow article which is a container.

In such an arrangement it is essential to be able to provide air to each set of molds at the appropriate time in the rotation of the wheel to provide air to blow the hollow article within the closed mold and to cut off the flow of air after the article has been formed.

Accordingly, among the objectives of the present invention are to provide an apparatus which will effectively control the flow of air to each set of molds; wherein the apparatus incorporates a valve assembly which is individual to each set of molds and is movable with each set of molds; wherein the timing of the opening and closing of the valve assembly can be readily adjusted along the path of the molds; and which can be readily applied and removed for assembly, maintenance and repair.

In accordance with the invention, the apparatus for controlling the application of the air comprises a valve assembly associated with each set of molds on the wheel and comprises a valve which is opened and closed to control the flow of air to the mold. The valve assembly includes a rotatable cam for moving the valve to open and closed positions, a starwheel associated with the cam, and a first actuator mounted at a first position along the path of the wheel for engagement with the starwheel to rotate the cam and open the valve and a second actuator mounted at a second position along the path of the wheel for engagement with the starwheel to rotate the cam and close the valve.

DESCRIPTION OF THE DRAWINGS

FIG. 3 is an elevational view on an enlarged scale of a portion of the apparatus shown in FIG. 1.

FIG. 4 is a fragmentary side view taken along the line 4—4 in FIG. 3.

DESCRIPTION

Figure 1:
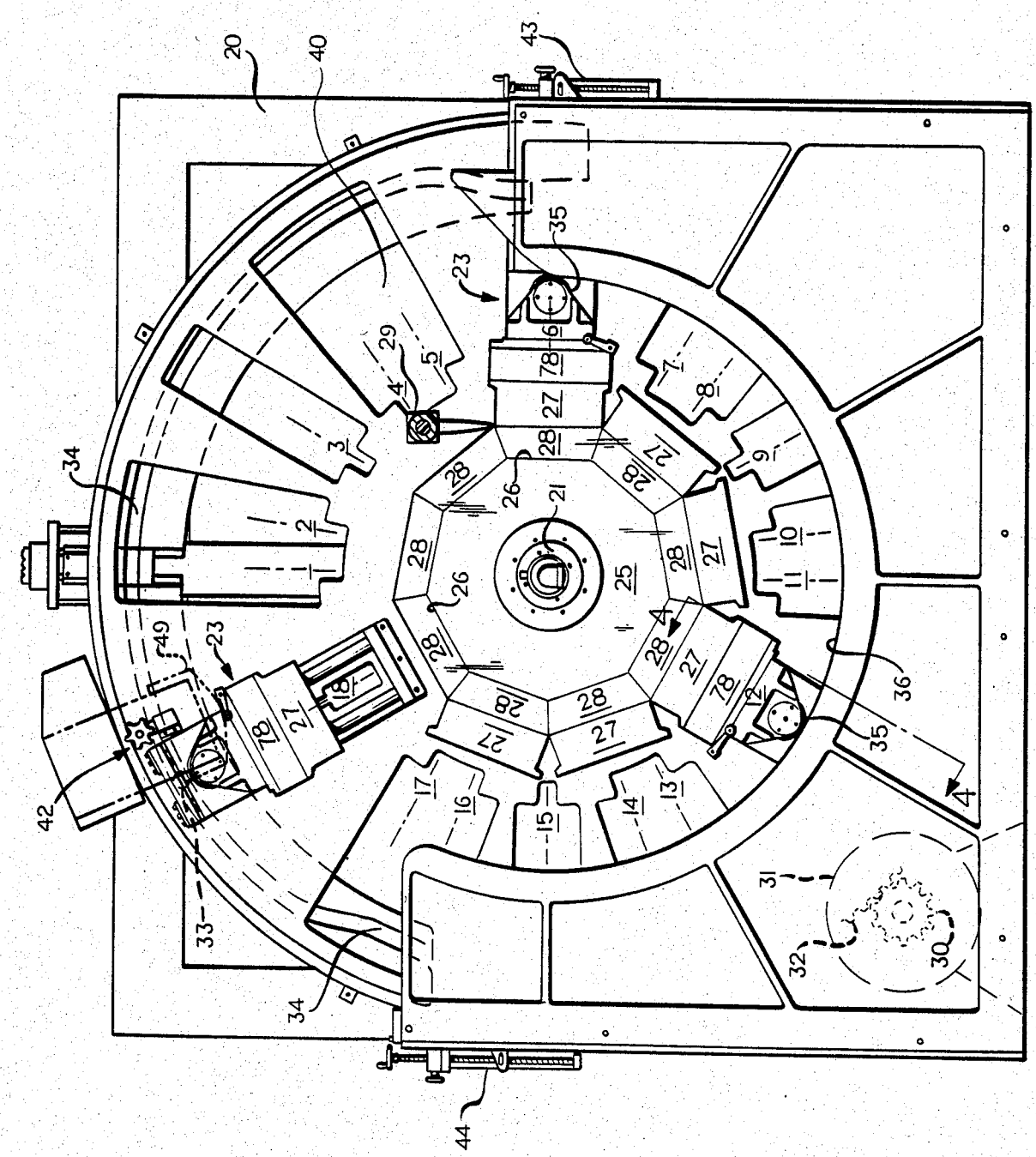
FIG. 1 is a part sectional elevational view of an apparatus embodying the invention, parts being broken away.
Figure 2:
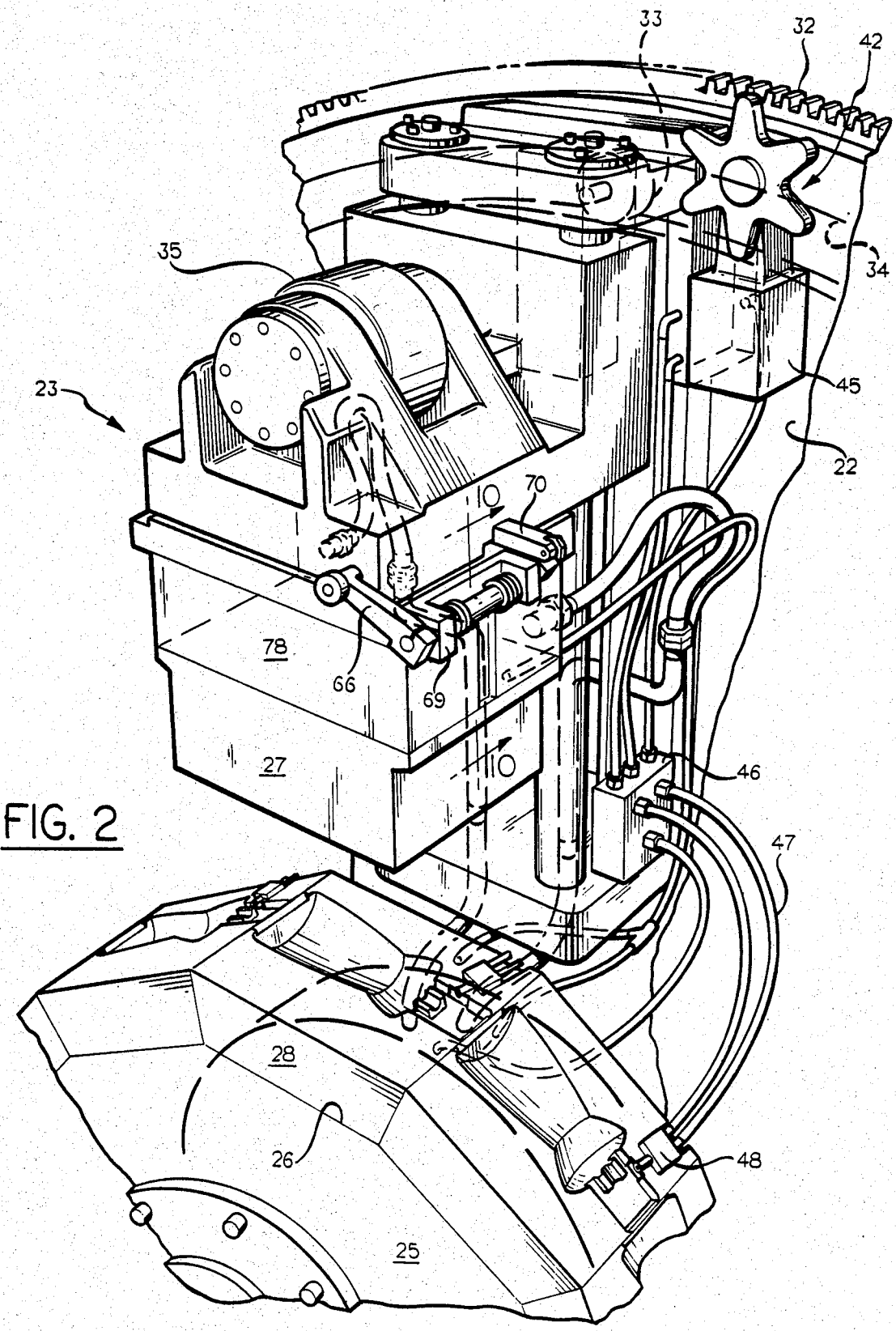
FIG. 2 is a fragmentary perspective view on an enlarged scale of a portion of the apparatus shown in FIG. 1.
Figure 5:
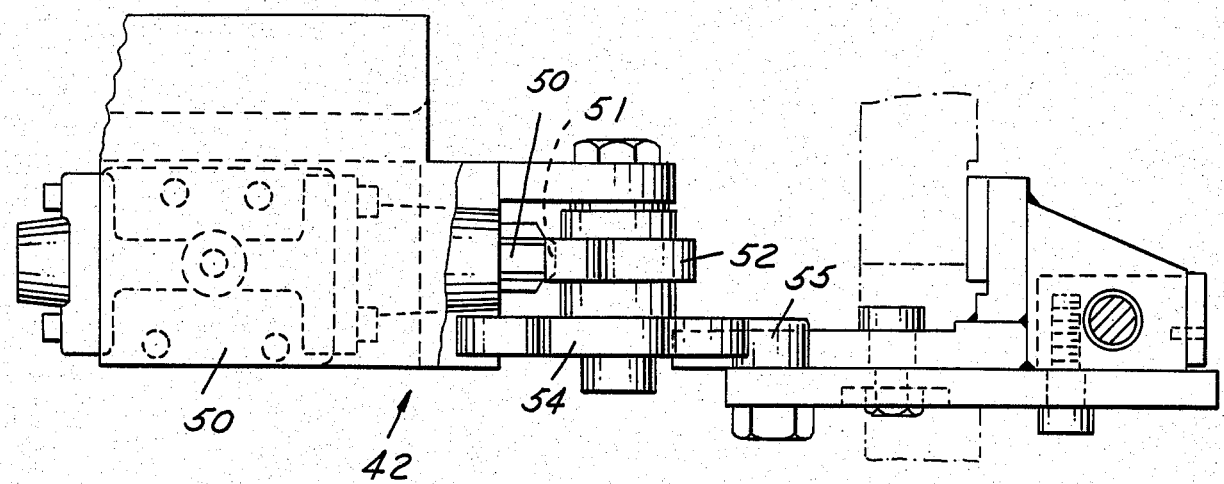
FIG. 5 is a fragmentary plan view taken along the line 5—5 in FIG. 1.
Figure 6:
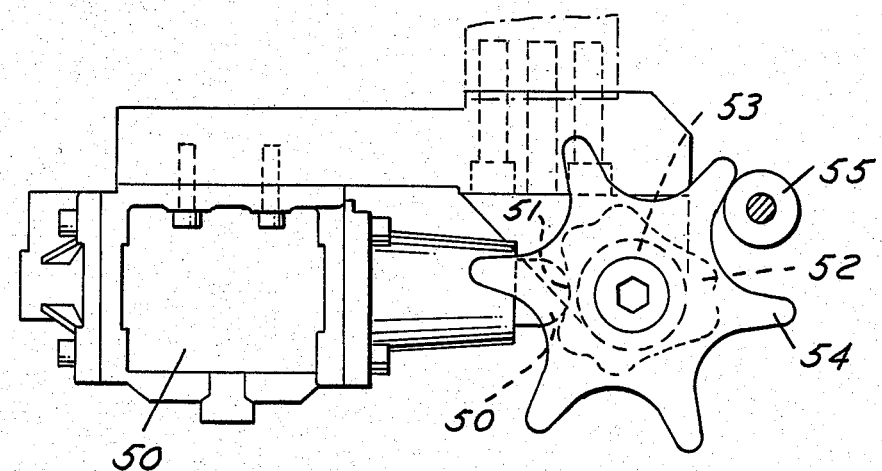
FIG. 6 is a fragmentary front elevational view of a portion of the apparatus shown in FIG. 5.

Referring to FIG. 1, the blow molding apparatus embodying the invention comprises a frame 20 in which a shaft 21 is mounted for rotation about a horizontal axis by spaced bearing in cantilever fashion. A wheel plate 22 is rotatably mounted on the shaft 21 for rotation with the shaft 21 and supports a plurality of circumferentially spaced slide assemblies 23. A hub 25 is also mounted on the shaft and has a plurality of circumferentially spaced mold supporting surfaces 26 corresponding in number to the number of slide assemblies 23.

Each slide assembly 23 comprises mold section mounting means for supporting a section or part 27 of a mold and the corresponding surface 26 of the hub 25 supports the second section 28 of a mold. Each slide assembly 23 is adapted to move the mold section 27 toward and away from the other mold section 28 to close about a heated parison emanating from an extruder head 29 so that the parison can be blown to the shape of the mold cavity defined by the mold sections 27, 28 as the wheel rotates. The parison is provided from the head 29 of an extruder in the two o'clock position as shown in FIG. 1.

Wheel plate 22 is rotated by a gear 30 driven by a motor 31 and meshing with a rack 32 on the periphery of the wheel plate. Each slide assembly 23 includes a cam follower 33 which engages a fixed arcuate cam 34 on the frame 20 to move mold section 27 toward and away from mold section 28. A second cam follower 35 on each slide assembly 23 engages a second fixed cam 36 on frame 20 to hold the mold sections 27, 28 in closed position. Second cam 36 extends generally from the three o'clock position just beyond the twelve o'clock position as viewed in FIG. 1.

An air valve assembly 42 is provided on each slide assembly 23 and is actuated by an actuator 43 along the path of the molds that functions to turn the blow air on for blowing the article and another actuator 44 is provided along the path to function to turn the air valve assembly 42 off cutting off the flow of blow air to the blowing apparatus. Each valve assembly 42 includes an on-off valve 45 that functions to control the flow of air to a valve block 46 and, in turn, through lines 47 to a blow pin 48 which functions to provide blow air for blowing the hollow article when the molds are closed in a manner well known in the art.

In operation, the plastic material is continuously extruded from the head 29 of the extruder and flows downwardly between the mold sections 27, 28. As the wheel plate continues to rotate, the mold sections 27, 28 are brought together pinching the plastic material and air is supplied to the interior of the tubular parison to blow the article in a manner well known in the art. As the article reaches the position when the blow mold is open (twelve o'clock position as viewed in FIG. 1), a fixed actuator 49 contacts and an ejector ejects the articles onto a conveyor.

Figure 8:
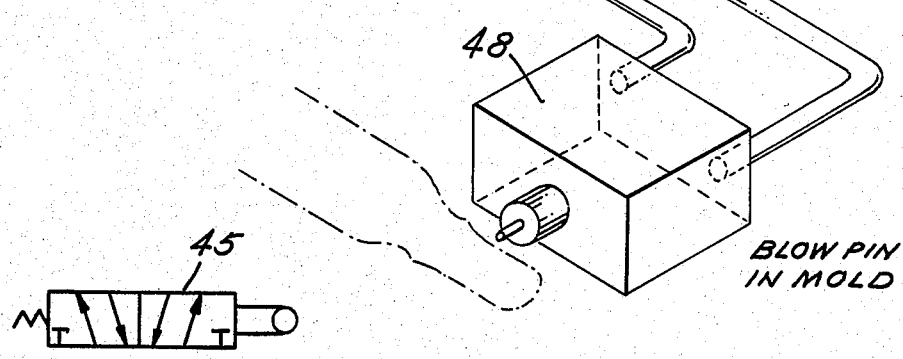
FIG. 8 is a graphic symbol of the valve utilized in the apparatus.

Referring to FIGS. 3 thru 6, air valve assembly 42 comprises a valve 45 which is preferably of the well-known roller stem actuated, spring return, five ported, four-way spool type having the schematic as shown in FIG. 8 and includes a stem 50 having a roller 51 at the outer end thereof that engages a cam 52 fixed on the shaft 53 of a starwheel 54 so that rotation of the starwheel 54 from one position to another will move the stem 50 and, in turn, operate the valve 56 between open and closed positions.

The actuator 43 comprises a roller 55 mounted on a bracket 56 which, in turn, is adjustably mounted on a base 57 supported on the main frame 20 of the apparatus.

As the set of molds having the valve assembly 42 thereon is moved past the actuator 43, the roller 55 of the actuator 43 engages a tooth of the starwheel 54 to move the valve 45 from the open to the closed position.

The actuators 43, 44 are identical except that they are mirror images of one another, the actuator 43 being adapted to open the air valve 45 and supply air to the molds and the actuator 44 being adapted to close the valve 45 and cut off the flow of air to the molds.

Referring to FIGS. 3 and 4, the bracket 56 that supports the actuator roller 55 is adjustably positioned on base 57 by bolts 58 that extend through an arcuate slot 59 on base 57. The arcuate slot 59 follows the path of the molds in the apparatus.

In order to assist in the adjustment, means are provided for moving the bracket 56 and comprise a screw 60 journalled in the base 57 and operated by a hand crank 58, a block 61 threaded on the screw 60 and operatively connected to the bracket 56 by a pin 62 on the block 61 extending through a slot 63 on the bracket 56. Thus, when the hand crank 58 is rotated, the block 61 is moved along the screw 60 and translates the bracket 56 along the slot 59, after the bolts 58 have been loosened. A second screw 64 is provided for engagement with the shaft of the screw 60 in order to lock the screw 60 in adjusted position.

In addition, a visual indicator comprising a pin 65 movable with the block 61 extends through a slot 66 in the base 57 to indicate the position of the actuator roller 55. A scale 67 is provided in association with the slot 65 through which the indicator pin 65 extends for indicating the measured position of the roller 55. In this manner the adjustment to the actuator roller 55 will determine the timing of opening of the valve.

The actuator 44 for closing the valve 45 after the blowing is of identical construction as that shown in the drawings except that it is the mirror image of the apparatus shown in FIGS. 3 thru 6.

Figure 7:
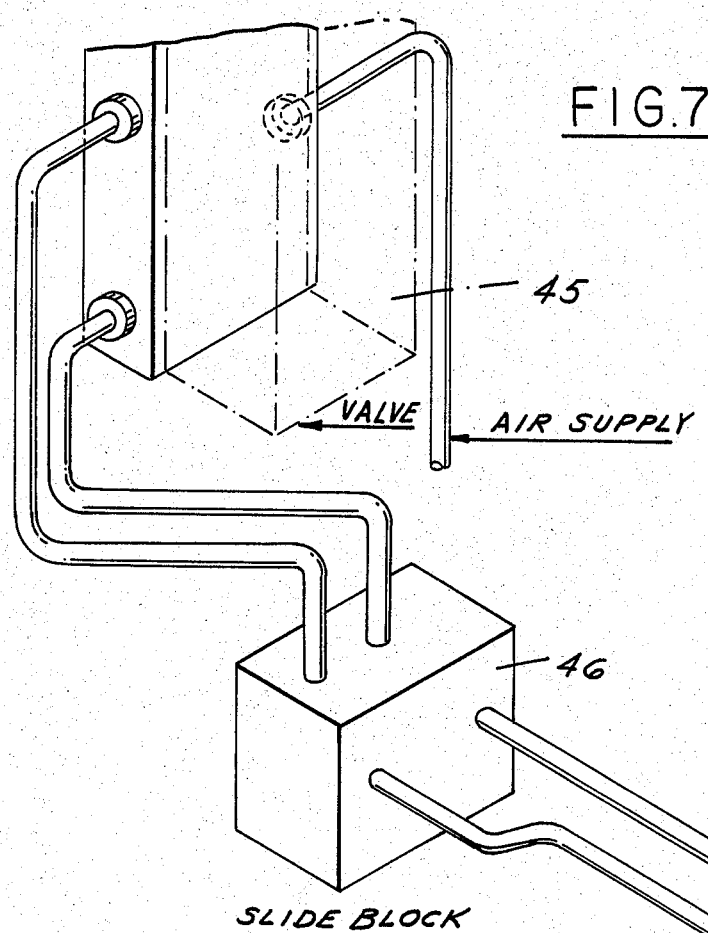
FIG. 7 is a diagrammatic view of the air supply circuit.

Referring to FIG. 7, it can be seen that the valve 45 receives air from a supply block 46 and functions to provide air to the blow pin 48, moving the blow pin 48 outwardly and supplying air when the valve 45 is open and returning the blow pin 48 to its original position when cutting off the blow air when the valve 45 is closed.

As shown, the starwheel has six radial arms defining six positions and the cam has six lobes, three at a small radius and three at a large radius, each lobe including a recess into which the roller 55 extends.

I claim:

1. In a blow molding apparatus wherein a plurality of sets of molds are mounted on a wheel rotatable about an axis and the molds are moved toward and away from one another to enclose a parison and the parison is blown to the confines of the cavity between the mold sections as the wheel rotates by the application of air, an apparatus for controlling the application of the air comprising:
   a valve assembly associated with each set of molds on the wheel and comprising a valve which is opened and closed to control the flow of air to the mold,
   said valve assembly including a rotatable cam for moving the valve to open and closed positions,
   a starwheel associated with the cam,
   and a first actuator mounted at a first position along the path of the wheel for engagement with the starwheel to rotate the cam and open the valve,
   and a second actuator mounted at a second position along the path of the wheel for engagement with the starwheel to rotate the cam and close the valve.

2. The apparatus set forth in claim 1 wherein each said actuator includes means for adjusting the position circumferentially of the path of the wheel to thereby vary the timing of application and removal of air.

3. The apparatus set forth in claim 2 including indicia associated with said actuator for providing a visual indication of the position of the actuator.

4. The apparatus set forth in claim 3 including a scale associated with the indicia means for providing a measurement of the position of the actuator.

5. The apparatus set forth in claim 2 wherein said means for adjusting said actuator comprises a base along which said actuator may be moved.

6. The apparatus set forth in claim 5 including means for moving said actuator along said base.

7. The apparatus set forth in claim 6 wherein said means comprises a screw,
   said screw being journalled on said base,
   said actuator being threaded on said screw such that when the screw is rotated, the actuator is moved along said screw and along said base.

8. The apparatus set forth in claim 7 including means for clamping said actuator in adjusted position.

9. The apparatus set forth in claim 8 including means for locking said screw in adjusted position.

10. The apparatus set forth in claim 7 wherein said base guides the actuator in an arcuate path,
    and means interconnecting said actuator and said screw such that the rotation of the screw will move the actuator along said base.

11. The apparatus set forth in claim 8 wherein said last-mentioned means comprises a block movable along said screw by rotation of said screw,
    a slot on said actuator,
    and a pin on said block and extending through said slot such that, as the block is moved longitudinally along said screw, said pin is translated in said slot on said actuator so that the actuator can move in the arcuate path of the base.

12. The apparatus set forth in claim 1 wherein said valve comprises a roller stem actuated, spring return, four-way spool valve.

13. In a blow molding apparatus wherein a plurality of sets of molds are mounted on a wheel rotatable about an axis and the molds are moved toward and away from one another to enclose a parison and the parison is blown to the confines of the cavity between the mold sections as the wheel rotates by the application of air, an apparatus for controlling the application of the air comprising
    a valve assembly associated with each set of molds on the wheel and comprising a valve which is opened and closed to control the flow of air to the mold,
    said valve assembly including a rotatable cam for moving the valve to open and closed positions,
    a starwheel associated with the cam,
    said starwheel being adapted to be engaged by a first actuator at a first position along the path of the wheel to rotate the cam and open the valve, and a second actuator at a second position along the path of the wheel for engagement with the starwheel to rotate the cam and close the valve.

* * * * *